(12) United States Patent
Takahashi et al.

(10) Patent No.: US 6,878,879 B2
(45) Date of Patent: Apr. 12, 2005

(54) PROTECTOR FOR WIRE HARNESSES AND MOUNTING MECHANISM

(75) Inventors: Shigeki Takahashi, Wako (JP); Shintaro Muro, Wako (JP)

(73) Assignee: Honda Giken Kogyo Kabushiki Kaisha, Tokyo (JP)

( * ) Notice: Subject to any disclaimer, the term of this patent is extended or adjusted under 35 U.S.C. 154(b) by 0 days.

(21) Appl. No.: 10/353,518

(22) Filed: Jan. 27, 2003

(65) Prior Publication Data

US 2003/0159846 A1 Aug. 28, 2003

(30) Foreign Application Priority Data

Feb. 22, 2002 (JP) ........................................ 2002-046422

(51) Int. Cl.$^7$ ................................................. H02G 1/00
(52) U.S. Cl. ...................... 174/72 A; 174/68.3; 174/69; 264/400
(58) Field of Search ........................ 174/68.3, 69, 68 C, 174/86, 97, 98, 72 A; 264/400, 515, 516, 540, 152

(56) References Cited

U.S. PATENT DOCUMENTS

| | | | | |
|---|---|---|---|---|
| 3,819,849 A | * | 6/1974 | Baker .......................... | 174/68.3 |
| 4,819,970 A | * | 4/1989 | Umehara ..................... | 285/227 |
| 4,891,471 A | * | 1/1990 | Ono et al. .................. | 174/68.3 |
| 5,160,811 A | * | 11/1992 | Ritzmann .................. | 174/68.3 |
| 5,500,179 A | * | 3/1996 | Onishi et al. ............... | 264/400 |
| 6,274,813 B1 | * | 8/2001 | Houte et al. ............... | 174/68.3 |

FOREIGN PATENT DOCUMENTS

JP          4-28722          3/1992

* cited by examiner

Primary Examiner—Dean A. Reichard
Assistant Examiner—Jinhee Lee
(74) Attorney, Agent, or Firm—Merchant & Gould P.C.

(57) ABSTRACT

A protector for wire harnesses and mounting mechanism are provided, including a body with closed cross section through which the wire harnesses are routed and at least two mounting elements by which the protector is attached to receiving elements. The protector has a feature that a position adjuster including a flexible portion is provided in the body extending between the two mounting elements so that a relative position of the two mounting elements can be easily adjusted.

5 Claims, 4 Drawing Sheets

US 6,878,879 B2

PROTECTOR FOR WIRE HARNESSES AND MOUNTING MECHANISM

FIELD OF THE INVENTION

The present invention relates to a protector for wire harnesses.

BACKGROUND OF THE INVENTION

A protector has usually been employed for protection of wire harnesses, which are routed behind an instrument panel of a vehicle and the like. When wire harnesses are routed along a mounting surface, a protector having U-shaped cross section is used to cover them, for example. In this case, the wire harnesses are covered by the three surfaces of the protector and the mounting surface, which serves as the fourth surface to make a closed surrounding.

The wire harnesses, which are installed behind an instrument panel, are often routed not along a mounting surface but in a space provided behind the instrument panel. In this case, a protector having a closed cross section is typically used, which covers 360 deg. around the wire harnesses. A protector of this type, which normally has at least two mounting elements which are mated with given receiving elements, is fixed by them.

Receiving elements are not necessarily positioned accurately with respect to each other due to errors associated with assembly and manufacturing. When one of the mounting elements of a protector is mated with one of the receiving elements, it may have the problem that a relative displacement between the other mounting element and the other receiving element occurs so that the protector cannot be smoothly attached. Even though a protector is usually made of a somewhat flexible material such as resin, it may be that a large load is applied to the mounting and receiving elements if the protector is forcefully bent during assembly. A protector having a closed cross section, which intrinsically has a small allowance in terms of flexibility due to high stiffness, especially burdens an operator with difficulty in attachment of the protector.

SUMMARY OF THE INVENTION

The object of the present invention is to provide a protector for wire harnesses and a mounting mechanism therefor, which enable smooth attachment of the protector to receiving elements even if they are relatively displaced.

The present invention provides a protector for wire harnesses including a body with closed cross section through which the wire harnesses are routed and at least two mounting elements by which the protector is attached to receiving elements. The protector has a feature that position adjustment means including a flexible portion is provided in the body extending between the two mounting elements so that a relative position of the two mounting elements can be adjusted.

In this way, even if the positions of receiving elements are displaced, the arrangement described above, which enables the adjustment of relative position of two mounting elements, allows an easy attachment of the protector. It can also prevent a large amount of load from acting on the mounting and receiving elements.

If the position adjustment means includes at least a slit, the resultant simple structure can attain an economical protector for wire harnesses.

Also if the two mounting elements are positioned so that the directions of mounting thereof cross at right angles, the first one is mated with a receiving element and then the second one can be easily mated with the other receiving element while the protector is pivoted around the first mounting element, and thereby easy attachment of the protector can be accomplished.

The present invention further provides a mechanism for attaching the protector to the receiving elements, in which at least two receiving elements are provided independently. In this way, even if the individual receiving elements, which have flexibility in layout design that is for example applied to a confined space behind an instrument panel, are inadvertently placed offset from a predetermined relative position, the protector can be easily attached by the adjustment means including a flexible portion. Therefore, the flexibility associated with layout design of the receiving elements is compatible with the workability for attachment of the protector.

DESCRIPTION OF THE PREFERRED EMBODIMENTS

Figure 1:
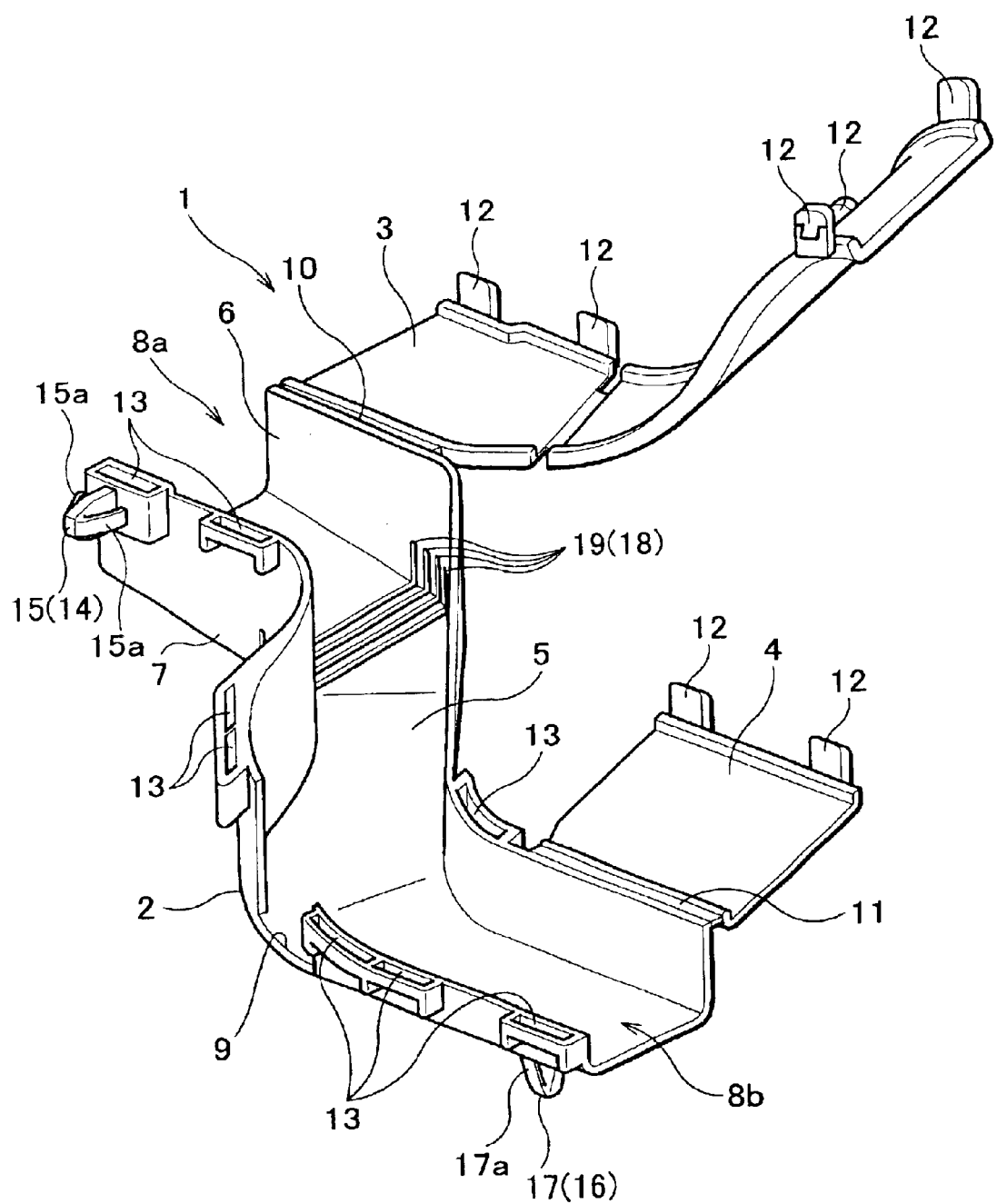
FIG. 1 is a perspective view showing a protector for wire harnesses with opened first and second covers.
Figure 2:
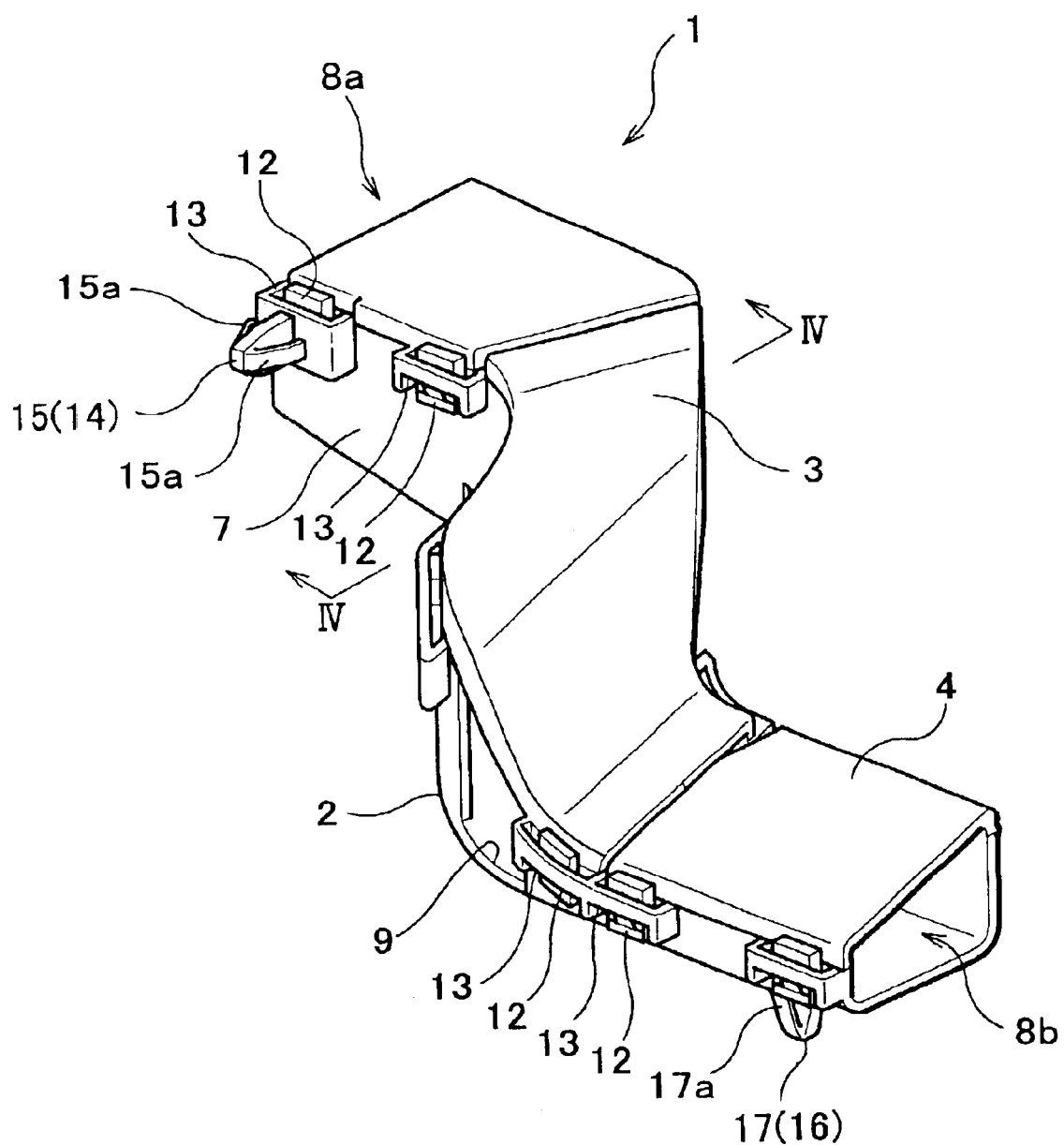
FIG. 2 is a perspective view showing a protector for wire harnesses with closed first and second covers.

An embodiment of the present invention will now be described with reference to the accompanying drawings. FIGS. 1 and 2 are perspective views showing a protector for wire harnesses. FIG. 1 is a view showing the protector with opened first and second covers and FIG. 2 is a view showing the protector with closed first and second covers. FIG. 3 is a side view illustrating attachment of the protector and FIG. 4 is a sectional view taken along line IV—IV shown in FIG. 2.

A protector 1 for wire harnesses (hereinafter referred to as a protector), which is for protecting wire harnesses H (see FIGS. 3 and 4) typically routed in an open space, has a closed cross section, to be described later, so that the protector 1 can cover 360 deg. around the wire harnesses H.

The protector 1, which is a casing made of a flexible synthetic resin such as polypropylene, comprises a base portion 2, a first cover 3 and a second cover 4. The base portion 2 includes a base plate 5 extending in a direction of routing of the wire harnesses H (see FIG. 3), and a pair of side walls 6 and 7 which stand perpendicularly on both the lateral ends of base plate 5 and extend in the longitudinal direction. The base plate 5 of the present embodiment is configured in S shape when it is seen from a direction perpendicular to the base plate 5 as shown in FIG. 3. Also as shown in FIG. 1, the side walls 6 and 7 stand on both the curved lateral ends of base plate 5.

The base portion 2, which is arranged as described above, accordingly has insertion ports 8a and 8b at both the longitudinal ends which serve as an inlet and an outlet for the wire harnesses H. And as shown in FIG. 4, a cross section perpendicular to the longitudinal direction makes a shape of U having an upward aperture. In the present embodiment as shown in FIG. 1, the side wall 7 has different heights at the insertion ports 8a and 8b respectively, and an opening 9, for example, for routing a part of the wire harnesses H branched in the protector 1. These features are not mandatory but may be adopted as the case may be.

The first cover 3 is integrally formed with the base portion 2 through a thinned hinge portion 10 at an upper edge of side wall 6 on the closer side of insertion port 8a. The second cover 4 is also integrally formed with the base portion 2 through a thinned hinge portion 11 at an upper edge of side wall 6 on the closer side of insertion port 8b.

A plurality of claws 12 project from the first and second covers 3 and 4, respectively. On the other hand, a plurality of receiving sockets 13 are formed on outside surfaces of side walls 6 and 7. When the first and second covers 3 and 4 are bent around the hinge portions 10 and 11 respectively as shown in FIG. 2 to close the upward aperture of base portion 2, a claw 12 is inserted and locked with a corresponding receiving socket 13. As shown in FIG. 2, a gap between the first and second covers 3 and 4 is very small when they are closed. In this way, when the first and second covers 3 and 4 are closed, the protector 1 is closed and is approximately rectangle in cross section as shown in FIG. 4, through which the wire harnesses H can be routed.

As shown in FIG. 1, a first mounting element 14 is formed on an outer surface of side wall 7 on the closer side of insertion port 8a. In this embodiment, the first mounting element 14 includes a clip 15 which projects perpendicularly from the side wall 7. A clip of known type, which has a locking mechanism 15a capable of elastic displacement, may for example be adopted.

A second mounting element 16 is formed on an outer surface of base plate 5 on the closer side of insertion port 8b. The second mounting element 16 also includes a clip 17 which projects perpendicularly from the base plate 5. The clip 17 is, for example, structurally the same as the clip 15 and has a locking mechanism 17a capable of elastic displacement. The directions of projection of clips 15 and 17, which coincide with directions of mounting thereof to receiving elements, cross at right angles.

The protector 1 including a closed cross section has position adjustment means 18 which is made of a flexible portion between the clip 15 (first mounting element 14) and the clip 17 (second mounting element 16) so that the relative position of clips 15 and 17 can be adjusted. In this embodiment, the position adjustment means 18 includes at least one slit 19. On the other hand, FIG. 1 shows an example in which four slits are employed.

It is preferred that the slit 19 should be formed so that it intersects the longitudinal direction of protector 1 at a crossed axes angle. Further, it will be more preferred to increase flexibility if the slit 19 and the longitudinal direction of protector 1 cross at right angles. In the present embodiment, as shown in FIG. 4, the slit 19 is formed so that it extends into both right and left side walls 6 and 7.

Figure 3A:
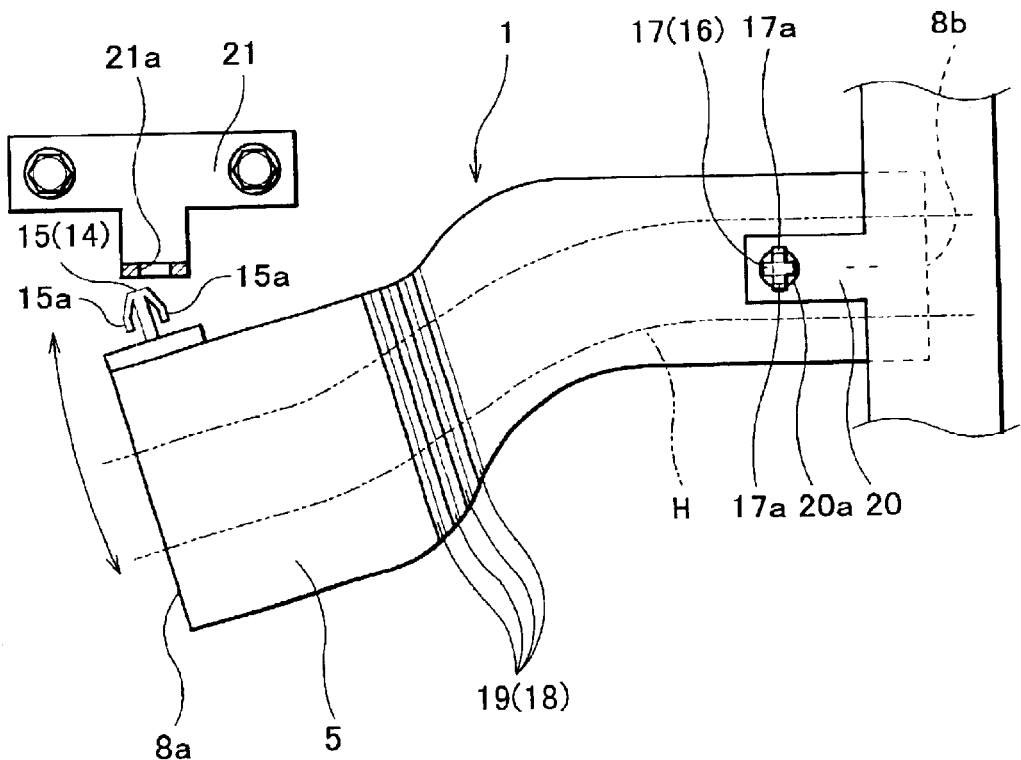
FIGS. 3A and 3B are side views illustrating mounting of the protector.
Figure 3B:
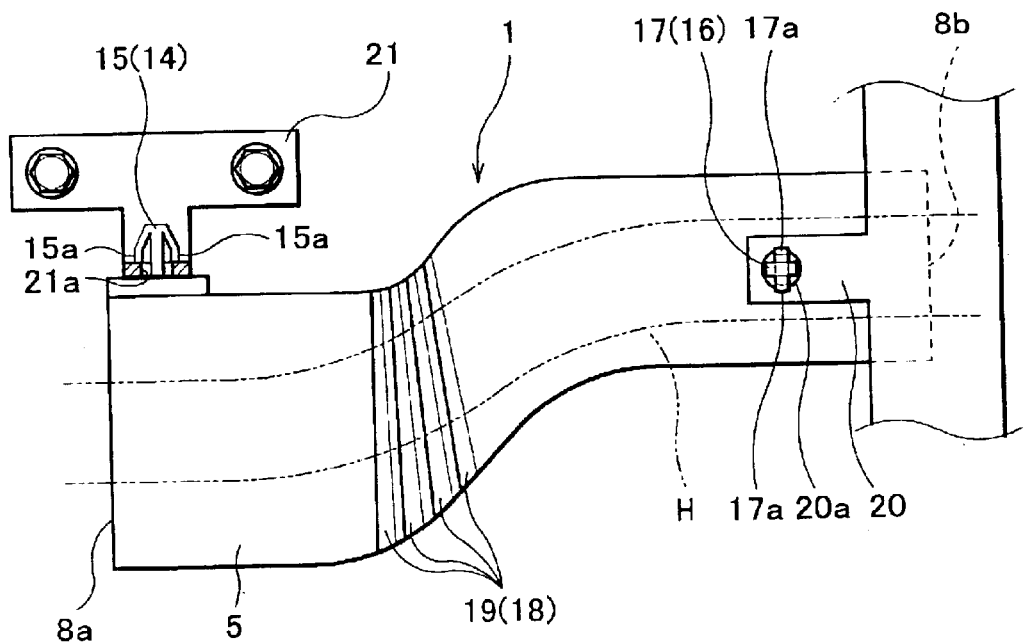
Figure 4:
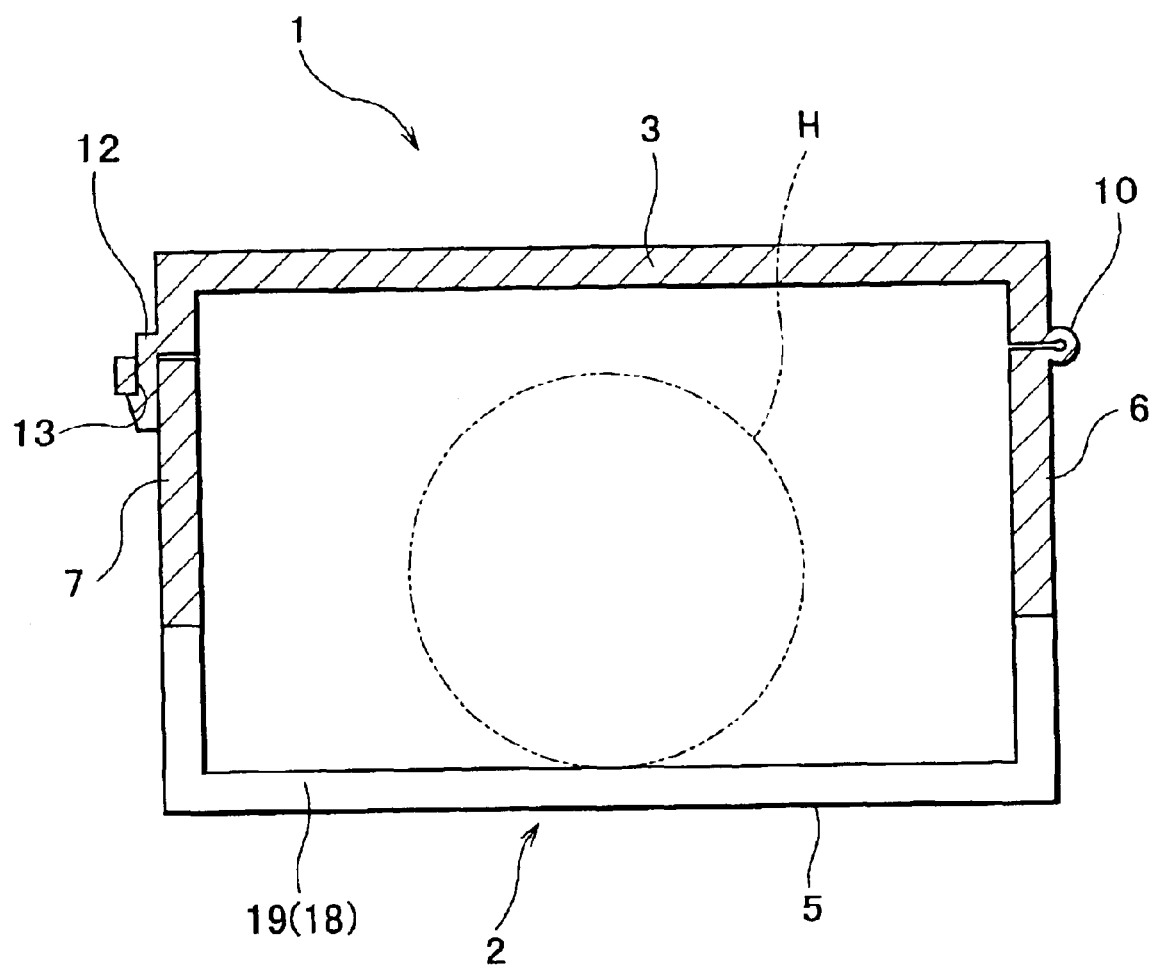
FIG. 4 is a sectional view taken along line IV—IV shown in FIG. 2.

Brackets 20 and 21 shown in FIG. 3, which are separately provided in a space surrounded by an instrument panel of a vehicle and the like, serve as receiving elements to which the protector 1 is attached. Receiving holes 20a and 21a are provided in the brackets 20 and 21 respectively, the directions of which cross at right angles. An example of steps to attach the protector 1 to the brackets 20 and 21 will be described. First, the clip 17 is inserted and locked with the receiving hole 20a. FIG. 3A shows the clip 17, which is seen as coming out of the sheet. In the configuration shown in FIG. 3A, the protector 1 is pivotable about the clip 17.

When the clip 15 is inserted and locked with the receiving hole 21a while the protector 1 is being pivoted upward, a portion of protector 1 on the closer side of clip 15 can be bent easily through the slit 19 and therefore the adjustment of position for clip 15 can easily be done, even if there is a displacement between the receiving hole 21a and the clip 15. Thus, an operator can easily bend the portion of protector 1 on the closer side of clip 15, thereby locking the clip 15 with the receiving hole 21a smoothly (see FIG. 3B). In the configuration shown in FIG. 3B, the slit 19 can also prevent a big load from acting on the clips 15 and 17, respectively.

In this way, the slit 19 can achieve improvement in attachment of the protector 1. Furthermore, if the clips 15 and 17 are positioned so that the directions of mounting thereof cross at right angles, the clip 15 can be mated much more easily with the receiving hole 21a while the protector 1 is being pivoted about the other clip 17 and thereby further improvement can be achieved.

Even if the independently provided brackets 20 and 21, which have design flexibility for their layout that is for example applied to a confined space behind instrument panel, are inadvertently placed offset from a predetermined relative position, the protector 1 equipped with the position adjustment means 18 including the slit 19 can provide an easy mounting mechanism.

An exemplary preferred embodiment of the present invention has been described. Though bellows can be an alternative to the slit 19, the slit 19 can provide an economical protector 1 as it is a simple structure. The number, pitch and shape of slits 19 are not limited to those shown in the drawings but they may be selected depending on the configuration of protector 1. While the invention has been described in detail and with reference to specific embodiments thereof, it will be apparent to one skilled in the art that various changes and modifications can be made therein without departing from the spirit and scope thereof.

What is claimed is:

1. Protector apparatus for wire harnesses for mounting in a vehicle, comprising:
    a non-flexible body with closed cross section having insertion ports through which said wire harnesses are routed;
    receiving elements attached to said vehicle;
    at least two mounting elements by which said non-flexible body is attachable to said receiving elements, each mounting element being attached to an outer surface of non-flexible body, wherein a direction of said one mounting element and a direction of said other mounting element cross at right angles; and
    position adjustment means including a flexible portion provided in a portion of said non-flexible body extending between said two mounting elements so that a relative position of said two mounting elements can be adjusted;
    wherein the non-flexible body is pivotally attachable to each receiving element through each mounting element.

2. A protector apparatus according to claim 1, wherein said position adjustment means includes at least a slit.

3. A mechanism for attaching said protector apparatus according to claim 2 to said receiving elements, wherein a number of said receiving elements is at least two and said receiving elements are provided independently.

4. A mechanism for attaching said protector apparatus according to claim 1 to said receiving elements, wherein a number of said receiving elements is at least two and said receiving elements are provided independently.

5. Protector apparatus for wire harnesses for mounting in a vehicle, comprising:

a non-flexible body with closed cross section having insertion ports through which said wire harnesses are routed;

receiving elements attached to said vehicle;

at least two mounting elements by which said non-flexible body is attached to said receiving elements, each mounting element being attached to an outer surface of said non-flexible, body, wherein a direction of said one mounting element and a direction of said other mounting element cross at right angles; and position adjustment means including a flexible portion provided in a portion of said non-flexible body extending between said two mounting elements so that a relative position of said two mounting elements can be adjusted, said non-flexible body further comprising a base portion and a cover, said cover having two part connected to each other by a first hinge which cooperates with said flexible portion of said position adjustment means, one of said two parts being coupled to said base portion by a second hinge;

wherein the non-flexible body is pivotally attachable to each receiving element through each molting element.

* * * * *